(12) United States Patent
Nordin

(10) Patent No.: US 6,330,877 B1
(45) Date of Patent: Dec. 18, 2001

(54) APPARATUS AND METHOD FOR ENABLING THE CALIBRATION AND/OR MONITORING OF A COMBUSTION PROCESS IN A COMBUSTION ENGINE

(75) Inventor: Mikael Nordin, Södertälje (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/556,649

(22) Filed: Apr. 24, 2000

(51) Int. Cl.⁷ .................................................. G01L 23/30
(52) U.S. Cl. .................... 123/480; 123/486; 123/406.58; 73/119 A; 701/107
(58) Field of Search ................................. 123/480, 406.47, 123/406.58, 406.62, 406.63, 406.65, 479, 486, 488; 701/105, 107; 73/119 A, 35.03, 117.3

(56) References Cited

U.S. PATENT DOCUMENTS

| | | | |
|---|---|---|---|
| 4,102,181 | 7/1978 | Cser et al. | 73/119 |
| 4,319,480 | 3/1982 | Yamaguchi et al. | 73/35 |
| 4,329,871 | 5/1982 | Grossner et al. | 73/35 |
| 4,364,260 | 12/1982 | Chen et al. | 73/35 |
| 4,532,592 * | 7/1985 | Citron et al. | 701/105 |
| 4,567,751 | 2/1986 | Ootsuka et al. | 73/35 |
| 4,573,347 | 3/1986 | Sekiguchi et al. | 73/119 |
| 4,658,794 * | 4/1987 | Day | 123/501 |
| 4,697,561 * | 10/1987 | Citron | 701/107 |
| 5,321,979 * | 6/1994 | McKendry et al. | 73/117.3 |

FOREIGN PATENT DOCUMENTS 2126724   3/1984   (GB).

* cited by examiner

*Primary Examiner*—Henry C. Yuen
*Assistant Examiner*—Hieu T. Vo
(74) *Attorney, Agent, or Firm*—Ostrolenk, Faber, Gerb & Soffen, LLP

(57) ABSTRACT

An arrangement and a method for calibration or monitoring a combustion process in a combustion engine, wherein an injection device injects fuel into a combustion chamber of the combustion engine. A noise-detecting sensor at the engine detects a parameter which derives from the noise generated during the combustion process. A control unit receives signal values representing the parameter from the sensors and receives information on the rotation position of a crankshaft in the combustion engine. The control unit determines the crankshaft position when the fuel is injected into the combustion chamber. Thereafter the injection device can be calibrated. Detecting the noise from combustion also makes it possible to assess whether combustion takes place at the intended time.

16 Claims, 3 Drawing Sheets

APPARATUS AND METHOD FOR ENABLING THE CALIBRATION AND/OR MONITORING OF A COMBUSTION PROCESS IN A COMBUSTION ENGINE

BACKGROUND TO THE INVENTION, AND STATE OF THE ART

The invention relates to an apparatus and a method for enabling the calibration and/or monitoring of a combustion process in a combustion engine involving detecting noise from the engine related to the combustion process.

The manufacture of a vehicle which is driven by a combustion engine usually involves calibration of the engine's fuel injection system. Such calibration is usually carried out by manual methods which may be complicated and time-consuming, particularly the calibration of a combustion process in a diesel engine which incorporates so-called unit injectors, i.e. a high-pressure pump in combination with an injection nozzle. Such unit injectors are arranged on each of the engine cylinders and each incorporates an individual electrical control. Each of these unit injectors has therefore to be individually calibrated so that it injects fuel into the respective combustion chamber at exactly the time when the engine crankshaft is in an optimum position for the combustion process.

During subsequent operation of the vehicle, usually there is no monitoring of the combustion process to check that combustion takes place correctly and at the right time. Any checks are usually carried out only on certain predetermined servicing occasions or when an observant driver of the vehicle discovers that some fault has occurred in the combustion process, e.g. by the engine noise having changed. The probability of someone substantially immediately discovering a fault in the combustion process is slight and continuing operation without correcting the fault may lead to serious damage which may entail large repair costs or may cause the vehicle to be stationary at an inappropriate time or at an inaccessible location.

SUMMARY OF THE INVENTION

The object of the present invention is to provide an arrangement and a method which make it easy and quick to calibrate a combustion process in a combustion engine so that an injection device injects fuel into the engine combustion chamber at a correct time. Another object is to enable subsequent monitoring of the combustion process so that any defects in the combustion process can be detected almost immediately and remedied in time before they lead to major damage.

These objects are achieved by the arrangement and the method according to the invention. There is at least one sensor at the engine which detects noise of the combustion process. The sensor may be a so-called knock sensor. The sensor detects a parameter which derives from the noise generated during the combustion process so that the time when the noise occurs can be determined in the control unit. The noise to be detected is not the mechanical noise of the injector, as in U.S. Pat. No. 4,102,181, but instead is the noise of the combustion process. The control unit also detects the rotation position of the crankshaft. It is therefore possible to determine the crankshaft position at which fuel is injected into the combustion chamber. The fuel is of course injected somewhat prior to combustion, but the difference in time is negligible. An injection device can therefore be calibrated so that it injects fuel into the combustion chamber when the crankshaft is in a position which is correct in this respect. The detection of the parameter enables monitoring of combustion process so that it is possible to immediately detect a fault occurring with respect to any of the components involved in the combustion process. The value of the parameter may make it possible to determine the type of fault and which component caused the fault.

According to a preferred embodiment of the invention, the parameter may consist of either the frequency or the amplitude of the noise generated during the combustion process. Preferably both of these parameters are registered in the control unit. Because the noise generated during the combustion process usually has a specific amplitude and frequency, this makes it easy for the control unit to recognize that noise and hence register the time at which it occurs. For the control unit to receive a signal that is as free as possible from interference, the arrangement may incorporate at least one filter which is arranged between the sensor and the control unit and which is designed to filter out signal values which are not due to the combustion process. Such a filter may incorporate at least a first filter device, e.g. in the form of an inverted bandpass filter, which is designed to allow only signal values at a specific frequency to pass through. The filter device may be designed to let through only signal values for noise at a known frequency which occurs during the combustion process. This means that such a filter device passes a signal to the control unit when the combustion process is taking place in the combustion chamber, but transmits no signal when no combustion is taking place in the combustion chamber. The control unit can thus register the time when a signal occurs after a pause and can therefore determine the time when the fuel is injected into the combustion chamber. This makes it possible to check that an injection device is injecting fuel into the combustion chamber at a correct time. The filter may also incorporate a second filter device, e.g. in the form of a bandpass filter, which is designed to allow signal values within at least one frequency range to pass through. Such a second filter may be connected in parallel with the first filter and let through signal values which derive from noise within a frequency range which is relevant to the combustion process. Interfering signals due to noise at a frequency outside that range are thus filtered out.

According to another preferred embodiment of the invention, the control unit may be designed to store signal values representing the parameter from a combustion process which incorporates a calibrated injection device. Such signal values relating to the noise which is generated during the combustion process may thus include information on the amplitude and frequency of the noise and the time at which the signal value occurs. The control unit may further be designed to monitor that the relevant signal values received representing the parameter correspond to the stored signal values. The control unit may be in communication with an indicating device which is designed to be activated if the relevant signal values received do not correspond to the stored signal values. Such differences between signal values may derive from the amplitude or frequency of the noise or the time at which the noise occurs. The indicating device may incorporate a lamp on an instrument panel of a vehicle, which lights up when a difference in signal value occurs, in order to make the driver immediately aware that a fault has occurred in the combustion process. Based on the nature of the faulty signal value, such an indicating device may possibly also indicate possible causes of the fault.

It is particularly advantageous to apply the present invention to a combustion engine which has a multiplicity of combustion chambers, each having an injection device. It may for example be a diesel engine with a unit injector arranged on each cylinder. In such cases, each injector has to be calibrated individually, which is complicated, but with the present invention that calibration of the fuel injection is considerably simplified.

The present invention also concerns a method for calibrating and/or monitoring the combustion process in a combustion chamber of an engine wherein the chamber is supplied with fuel by a fuel injection device. At least one parameter derived from the noise generated during combustion is detected. It is combined with information about the rotation position of the crankshaft for calibrating injection of fuel into the combustion chamber. Determining the position of the crankshaft at the time of combustion makes it possible to calibrate, for example, an injection pump so that it injects fuel exactly at the time when the crankshaft is in an optimum position for the combustion process.

According to another preferred embodiment, monitoring of the combustion process is enabled by storing signal values representing the parameter being stored from a combustion process with a calibrated injection device, by continuous monitoring, to see whether the relevant signal values received representing the parameter correspond to the stored signal values, and by providing an indication if the relevant signal values do not correspond to the stored signal values. For example, a driver of a vehicle may thus be immediately made aware that a fault has occurred in the combustion process in the engine and may take necessary measures.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
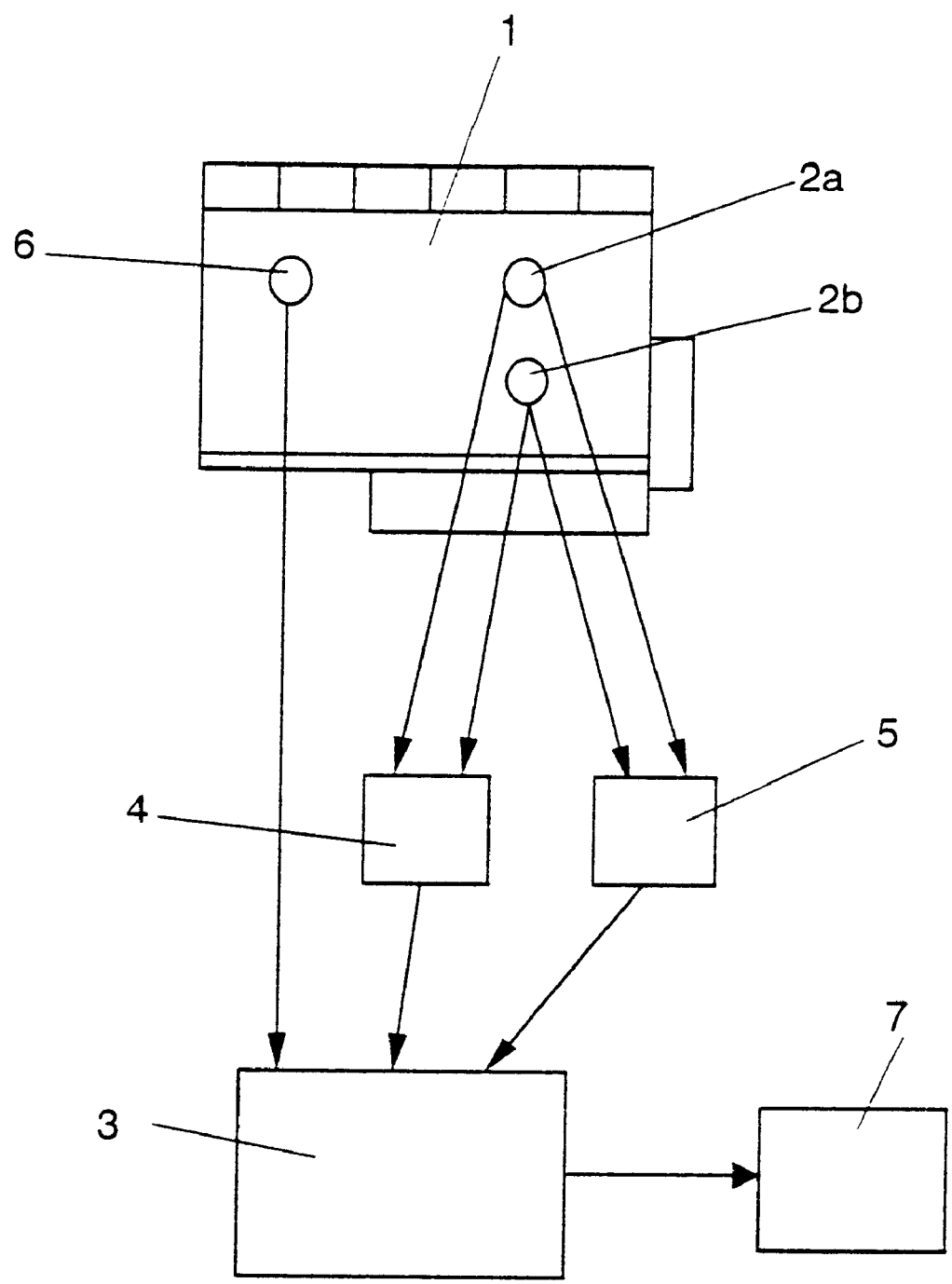
FIG. 1 schematically shows an arrangement according to the present invention which is designed to make possible the calibration and monitoring of a combustion process in a combustion engine.

FIG. 1 shows an arrangement which enables the calibration and monitoring of a combustion process in a combustion engine 1. The engine 1 is shown as a multi-cylinder engine having six cylinders shown schematically at the top of the engine 1 in FIG. 1. The arrangement incorporates two sensors 2a,2b at the engine that are in common for all cylinders and which are designed to detect noise which is generated during the combustion process of the combustion engine 1. Such sensors 2a,2b may be conventional so-called knock sensors. In the present example, two sensors are used for the engine, thereby ensuring that at least one sensor detects with good quality the noise generated by the engine. In certain cases, noise detection by only one sensor may be sufficient.

Figure 1A:
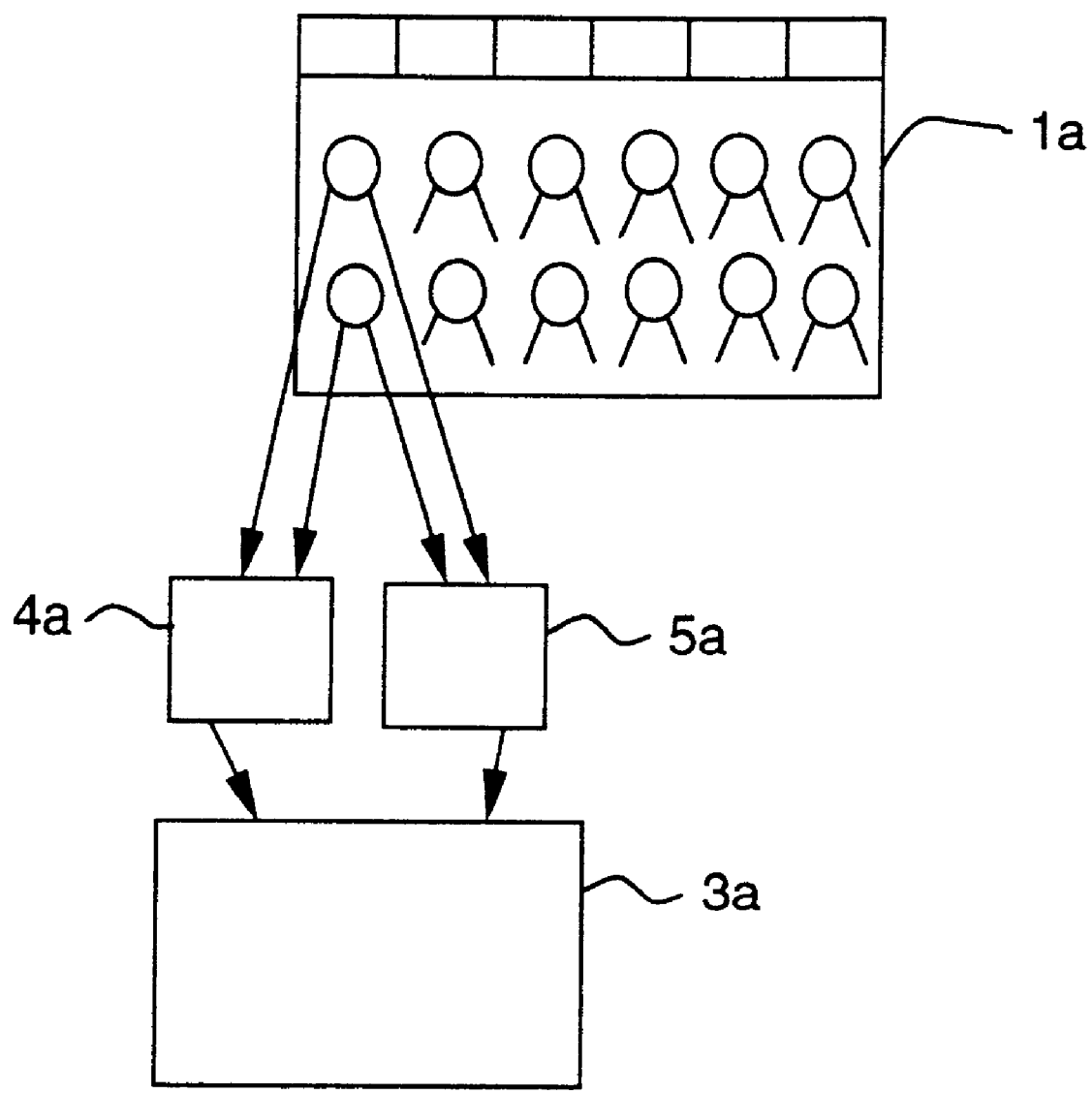
FIG. 1a schematically depicts an alternative arrangement.

Another alternative may be to place a sensor in the vicinity of each cylinder of the engine. FIG. 1a suggests a multicylinder engine 1a, with six cylinders illustrated and the engine is provided with respective sensors 2a and 2b in the region of each of the six cylinders, with each set of sensors detecting the values for the respective cylinder and all sensors communicating to a common control unit 3a, like unit 3, described below, through filter devices 4a and 5a, like devices 4 and 5, described below.

It should be noted that the sensors 2a,2b and their positioning in FIG. 1 are only depicted schematically and that their positioning is in practice in no way limited to that depicted. The sensors 2a,2b are designed to transmit signal values that represent detected noise to a control unit 3. Those signal values are intended to pass through a first filter device 4 which is designed to let through only signal values with substantially one specific frequency. This frequency corresponds to the frequency at which noise is mainly generated during the combustion process and may be about 4.5 kHz.

A second filter device 5 may be arranged in parallel with the first filter device 4. The second device 5 designed to allow signal values to pass through within a specific frequency range within which substantially all the relevant combustion noise occurs. Such combustion noise may arise partly from an injection pump/unit injector when it injects fuel into the combustion chamber and partly from the actual combustion of the fuel in the combustion chamber. The resulting signal from the filter device 5 is thus free from interference due to noise at a frequency which is outside its frequency range. Such a relevant frequency range may extend from 2 to 8 kHz.

The arrangement also incorporates a further sensor 6 which is designed to detect the position of the crankshaft in the combustion engine 2. The sensor 6 is designed to transmit a signal value representing the crankshaft's position to the control unit 3. When a single crankshaft sensor 6 is used, as shown in FIG. 1, for all cylinders of the engine, the crankshaft sensor can identify which cylinder is them in its combustion phase, and therefore can identify from which of the cylinders noise then derives.

The noise from the combustion engine 1 is thus detected by the two sensors 2a,2b and the signal values related to the noise are led in parallel through the two filter devices 4,5 to the control unit 3. The fact that the filter device 4 only lets through signal values at a specific frequency which corresponds to a primary frequency of a combustion noise means that the control unit 3 only receives a signal from the filter device 4 when combustion is taking place in the combustion chamber. At other times the control unit 3 receives no signal from the first filter device 4. The time of injection of fuel into the combustion chamber can therefore be determined by the control unit 3 determining the time of commencement of a signal after a signal pause. As the control unit 3 also receives a signal value representing the position of the crankshaft via the sensor 6, the control unit can determine the crankshaft position at which combustion takes place in the combustion chamber. Accordingly, if the crankshaft position does not correspond to the intended optimum position for the combustion process, the injection pump/unit injector can be calibrated so that the fuel is injected at exactly the time when the crankshaft is in the position intended for combustion.

From the sensors 2a,2b, signal values which are related to the combustion noise are also transmitted to the control unit 3 via the filter device 5. Those signal values are filtered so that only signal values within a frequency range relevant to the combustion process are let through to the control unit 3. The control unit 3 is designed to compare relevant signal values with stored signal values which are obtained from a combustion process with a calibrated injection pump or unit injector. Such comparison may cover signal values related to the amplitude and frequency of the noise and the time at which the noise occurs. Should the relevant signal values not correspond to the stored signal values, the control unit 3 activates an indicating device 7 which may be arranged on an instrument panel of a vehicle. This indicating device 7 can make the driver of a vehicle aware of a fault occurring in the combustion process of the engine 1. In this case, the control unit may also be designed to indicate via the indicating device 7 possible faults in the combustion process based on the way in which the relevant signal value differs from the stored signal value. Such faults may often derive from differences in amplitude and frequency of the signal values or differences in the time when they occur. The control unit 3 may also observe whether the fault derives from the noise which is generated during fuel injection or during fuel combustion. Such indicatable faults may be due to defects of components of the combustion engine or of the injection pump/unit injector, or it may be that the fuel being used is inappropriate.

Figure 2:
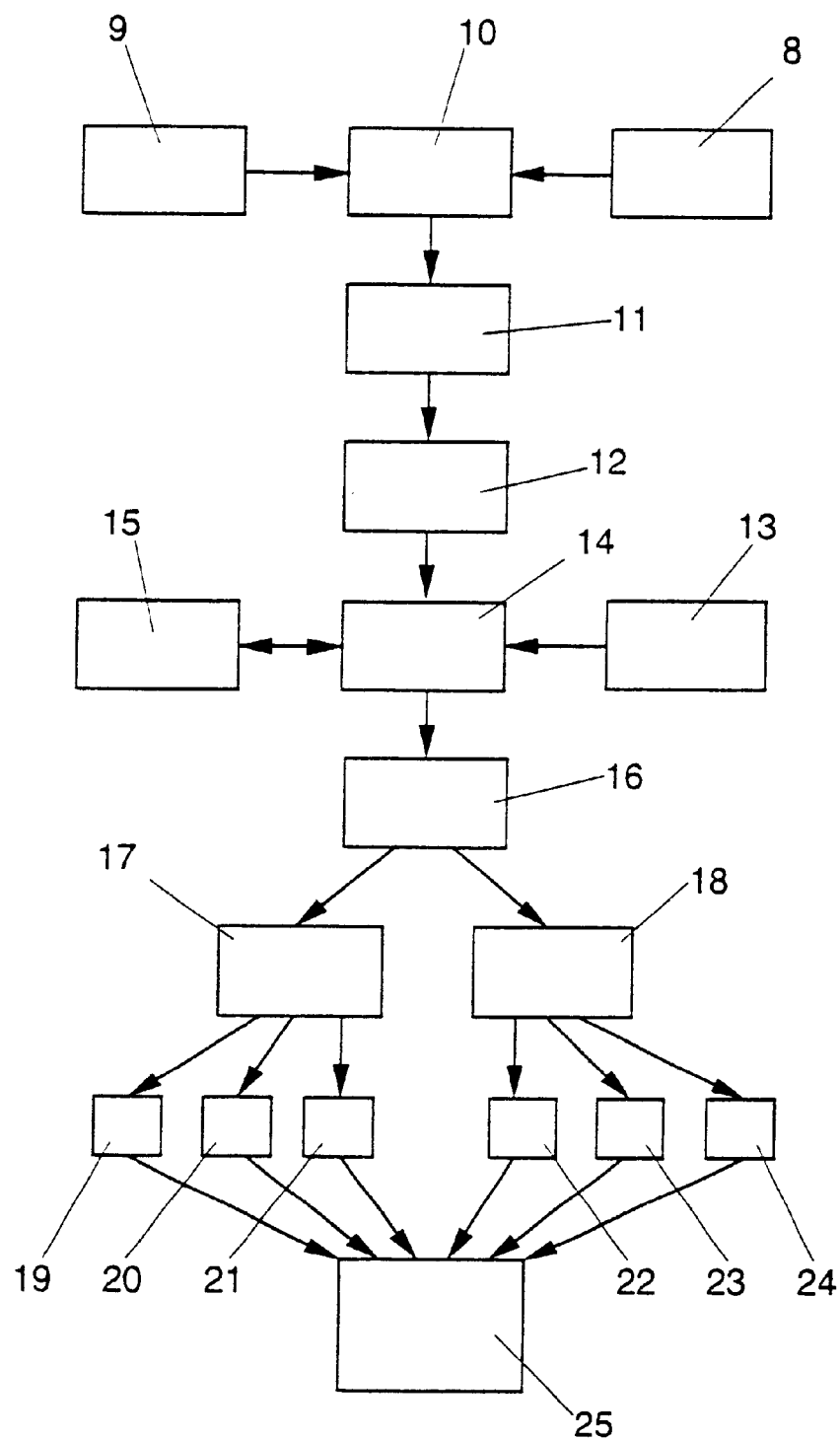
FIG. 2 schematically shows a flow diagram of a method according to the present invention for making possible the calibration and monitoring of a combustion process in combustion engine.

FIG. 2 is a flow diagram representing a method according to the present invention for calibrating and monitoring a combustion process in a combustion engine. The noise generated during the combustion process is detected at 8 by the sensors 2a,2b of FIG. 1, and the crankshaft position in the combustion engine is detected at 9 by the sensor 6. The resulting information representing the combustion noise from 8 and the crankshaft position from 9 is received at 10, where the crankshaft position at the time when the fuel is injected into the combustion chamber is determined. Calibration of the injection pump/unit injector is carried out at 11 so that fuel injection takes place at exactly the time when the crankshaft is in a predetermined position which is optimum in this respect. Such calibration of a combustion engine 1 of a vehicle takes place primarily during the manufacture of the vehicle/engine, but may also be carried out during testing of a combustion engine already in existence or at the time of installing a new combustion engine in the vehicle. Signal values representing the noise which is generated during a combustion process with a calibrated injection pump/unit injector are stored at 12 and are intended to serve further as reference values during the operation of the combustion engine 1. The method according to notations 8–12 above is applied with advantage during a manufacturing process of a vehicle/engine.

During continuing operation of the vehicle, relevant signal values 13 representing the combustion noise are supplied substantially continuously to 14, where the relevant signal values are compared with the stored signal values for a calibrated injection pump/unit injector. If the relevant signal values correspond to the stored signal values, this is registered at 15 and the process reverts to 14 for a fresh comparison. If, on the contrary, there is a difference, the fact that an abnormal relevant signal value is present is registered at 16. This changed relevant signal value is analyzed, followed first by determining whether the relevant signal value differs because of the noise 17 generated by the injection pump/unit injector when it injects fuel into the combustion chamber or because of the combustion noise 18 generated during the combustion of the fuel in the combustion chamber. This is followed by determining whether the difference/differences is/are related to the amplitude 19,22 and/or frequency 20,23 of the signal value or whether there is a time shift 21,24 denoting respectively the noise 17 from the injection device or the combustion noise 18. Possible faults of components involved in the combustion process are indicated thereafter at 25.

By such monitoring of the combustion process a driver of a vehicle is very quickly made aware of any fault occurring in the combustion process. This means that the fault can then be dealt with quickly without necessarily leading to major repairs. The fault need not be due entirely to components of the combustion engine 1 and the injection pump but may also be due, for example, to inappropriate fuel.

The invention is not limited to the embodiment described but may be varied freely within the scope of the invention. For example, the arrangement and method may be used for only calibrating the combustion process or monitoring the combustion process. Likewise the invention is not limited to a combustion engine in a vehicle but may pertain to any application of a combustion engine.

In a more developed embodiment of the invention, the control system may be designed so that it not only indicates a fault but also tries to remedy the fault, e.g. by altering the injection time or something else which at least reduces the problem of the fault or compensates for more natural changes taking place in the engine, e.g. through wear.

The embodiment described refers to a fuel injector in the form of a unit injection. But in alternative embodiments, the invention may be used in engines with conventional fuel injection nozzles. In that case, noise, which is not the mechanical noise and which occurs in the injector, can be detected and, in a manner analogous to that described, be used for calibration and/or monitoring.

Although the present invention has been described in relation to a particular embodiments thereof, many other variations and modifications and other uses will become apparent to those skilled in the art. It is preferred, therefore, that the present invention be limited not by the specific disclosure herein, but only by the appended claims.

What is claimed is:

1. Arrangement for enabling calibration and/or monitoring of a combustion process in a combustion engine wherein the engine includes a combustion chamber, in the engine at least one injection device for injecting fuel into the combustion chamber of the combustion engine, and a rotatable crankshaft, the arrangement comprising:

at least one noise-detecting sensor at the engine and adapted for detecting at least one parameter which derives from noise generated during the combustion process in the engine;

a control unit adapted for receiving signal values representing the parameter from the at least one sensor and for receiving information on the rotation position of the crankshaft in the combustion engine, the control unit being adapted to determine the time for injection of fuel into the combustion chamber and to determine the crankshaft position at that time.

2. Arrangement according to claim 1, wherein the detected parameter is amplitude or frequency of the noise.

3. Arrangement according to claim 1, further comprising at least one filter arranged between the at least one sensor and the control unit, the filter being operable to filter out signal values which do not derive from the combustion process.

4. Arrangement according to claim 1, wherein the filter includes at least a first filter device adapted to let through only signal values at a specific frequency.

5. Arrangement according to claim 4, wherein the filter includes at least a second filter device adapted to let through signal values within at least one frequency range.

6. Arrangement according to claim 5, wherein the detected parameter is the frequency of the noise.

7. Arrangement according to claim 3, wherein the filter includes at least a filter device adapted to let through signal values within at least one frequency range.

8. Arrangement according to claim 5, wherein the control unit is adapted to store signal values representing the parameter from a combustion process and wherein the injection device comprises a calibrated injection device.

9. Arrangement according to claim 8, wherein the control unit is further adapted designed to monitor the relevant signal values received which represent the noise corresponding to the stored signal values.

10. Arrangement according to claim 9, further comprising an indicating device in communication with the control unit, wherein the indicating device is adapted to be activated when the relevant signal values received do not correspond to the stored signal values.

11. Arrangement according to claim 1, wherein the control unit is adapted to store signal values representing the parameter from a combustion process and wherein the injection device comprises a calibrated injection device.

12. Arrangement according to claim 11, wherein the control unit is further adapted designed to monitor the relevant signal values received which represent the noise corresponding to the stored signal values.

13. Arrangement according to claim 12, further comprising an indicating device in communication with the control unit wherein the indicating device is adapted to be activated when the relevant signal values received do not correspond to the stored signal values.

14. Arrangement according to claim 1, wherein the combustion engine incorporates a multiplicity of combustion chambers which each have an injection device.

15. Method for enabling calibration or monitoring of a combustion process in a combustion engine wherein the engine includes a combustion chamber and at least one injection device for injecting fuel into a combustion chamber, the method comprising:

detecting at least one parameter deriving from noise generated during the combustion process;

providing information concerning the rotation position of the crankshaft in the engine;

calibrating the injection device to inject fuel on the basis of the information concerning the position of a crankshaft in the combustion engine and signal values representing the parameter, and the time for injection of fuel into the combustion chamber is also based on the position of the crankshaft at said time.

16. Method according to claim 15, further comprising storing signal values representing the parameter from a combustion process with a calibrated injection device for injecting fuel; continuously monitoring the relevant signal values received, which signal values represent the parameter to determine if the relevant signal values correspond to the stored signal values, and providing an indication if the relevant signal values do not correspond to the stored signal values.

* * * * *